Feb. 26, 1929.
A. G. BETTS
1,703,656
FURNACE ELEMENT AND PROCESS OF MAINTAINING THE SAME
Original Filed April 6, 1925  2 Sheets-Sheet 1
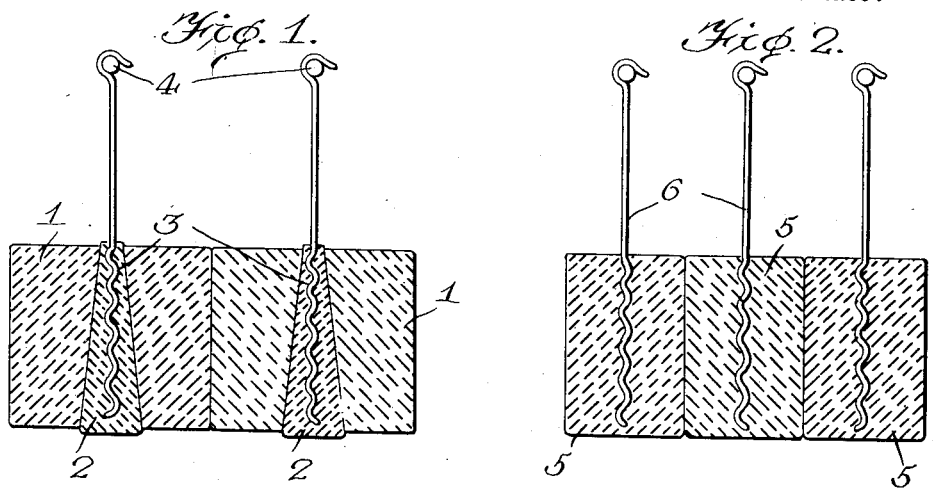
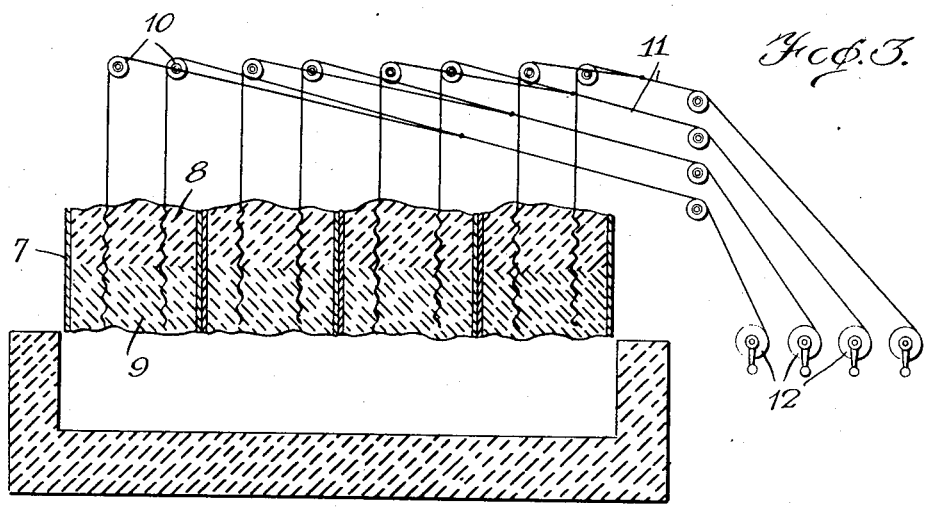
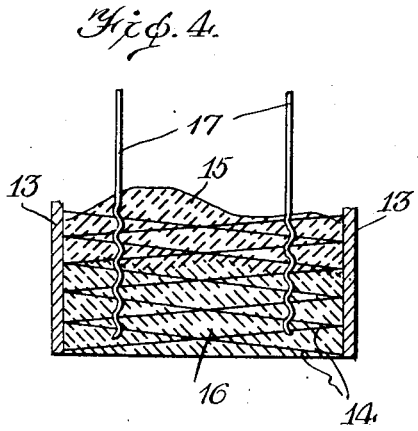
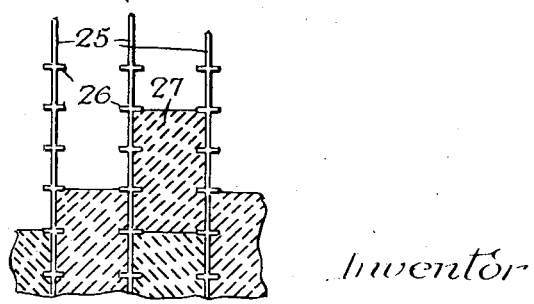
Inventor
Anson G. Betts

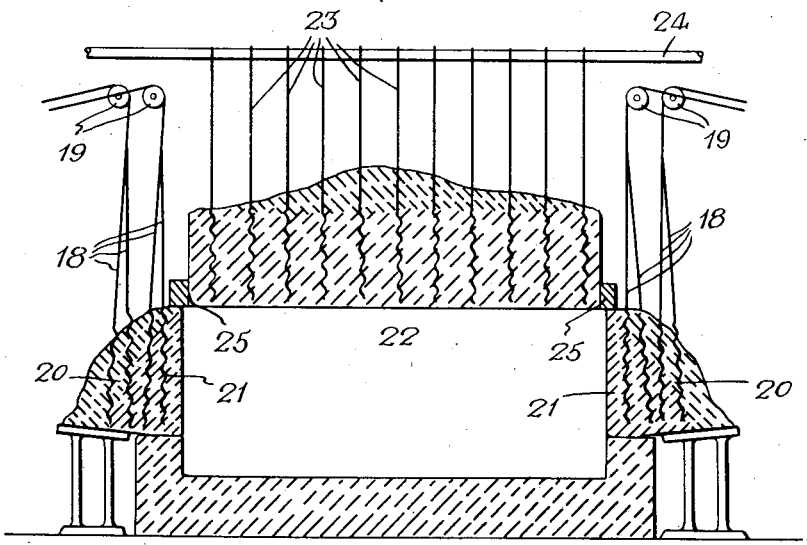
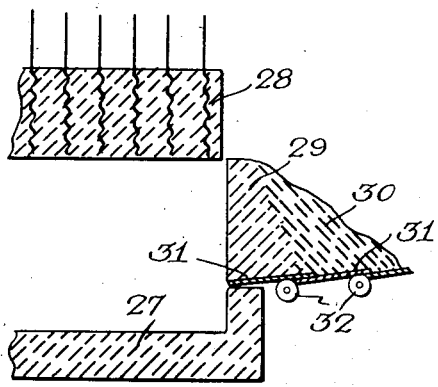
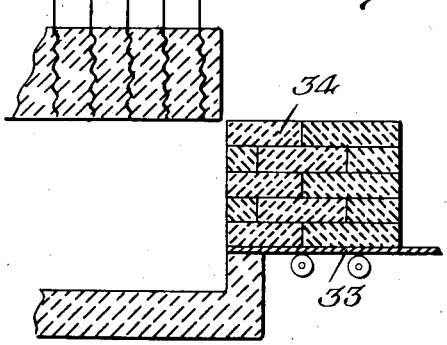
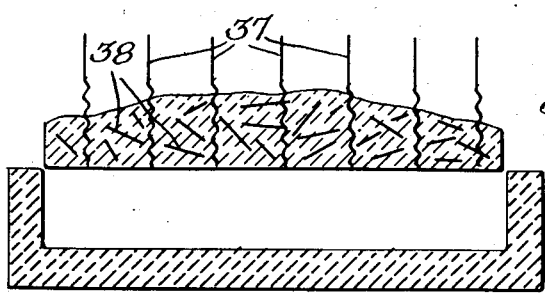

Patented Feb. 26, 1929.

1,703,656

UNITED STATES PATENT OFFICE.

ANSON G. BETTS, OF PLAINFIELD, MASSACHUSETTS.

FURNACE ELEMENT AND PROCESS OF MAINTAINING THE SAME.

Application filed April 6, 1925, Serial No. 21,231. Renewed December 12, 1928.

This invention relates to improvements in furnaces relative to construction and maintenance thereof.

The principal object of my invention is to lower the maintenance cost of furnaces subject to severe conditions. Other important objects will appear in the following description.

Hitherto in the construction of furnaces, in general the refractories have been applied in a way to require them to perform two main functions; one to resist heat, and the other, to serve as a material of construction. To a certain extent however, in the case of the so called "flat arches" or furnace roofs, consisting of blocks which are so shaped in the upper part to engage and be supported by metal supports, the bricks have really only served the one purpose of resisting heat, each brick being separately suspended from above, and not called on to support other bricks or serve as an element in a mechanical construction.

Such bricks and the metallic supporting members are not made integral, as the bricks have been made by burning at high heats in kilns, and after being burned, the metallic supports are fitted into suitable slots, and if the metal had been inserted in the refractory before burning, of course such metal part would be destroyed in the process.

In my invention, I prefer to combine the metallic supporting element with the refractory material in integral construction, as an economy and a means for elastic use, as will be noted. I accomplish this result readily by preparing a suitable fire-resistant in the shape of powder, such as ground fire brick, ground chrome ore, ground silica or silica brick, carborundum, alundum, zircon or other suitable powders, mold with a soluble bonding material, preferring basic chloride of aluminum solution, imbed the metallic member and heat or otherwise set the bond. Clay would be undesirable as a bonding material, as the objects would require too high a heat to vitrify, and shrinkage would be frequently fatal in the construction.

In Fig. 1, I have shown in contact blocks of ordinary fire burned refractory, 1, having a central cavity, which is then filled with a refractory mix of the foregoing described type, 2, with an imbedded metallic hook having corrugations or roughness as shown, 3. As a furnace roof the blocks are suspended side by side from supporting bars 4.

In Fig. 2, I have shown adjacent blocks for a furnace top 5, made from a non-shrinking mix not requiring high temperature burning 5, in which have been imbedded metallic hooks 6, as shown. Such blocks may be used when assembled as a "flat arch".

In my preferred form of invention however, as applied to a furnace top, shown as Fig. 3, the individual blocks are not manufactured as above and then assembled as described, but are continuously built up, as will be explained, by adding refractory mix on the top, as the bottoms are melted off below, giving both a low cost furnace top and one that avoids rebuilding. In the operation of this process of furnace roof maintenance, the entire roof can be all in one piece, but owing to the fact that furnaces melt unequally in different parts, it is better to subdivide such roof into more or less individual parts, so that the different elements may be lowered at different speeds to maintain the furnace shape for a long campaign. In Fig. 3, a cross section of a furnace is shown, the roof of which consists of a plurality of elements, which can be of any size, individually consisting of an outside shell, which may be of fire brick or tile or lumber or paper etc. 7, the utility of which is mainly for the purpose described below, and an interior main portion of refractory material which is applied in plastic form from time to time on top and suitably tamped down. A suitable mixture for the roof of a smelting furnace for copper smelting, is ground or powdered silica moistened with solution of basic aluminum chloride. Such a mixture on heating becomes a solid and hard silica refractory. The bottom of the blocks gradually melt off or are abraded or otherwise wasted away, and to maintain the furnace the roof elements are gradually fed downward and consumed, being replenished at the top to maintain any desired thickness of roof. In many furnaces, in melting steel, the silica roofs are expensive to replace and the roofs are made thin to conduct away the heat, thus reducing efficiency, but with a very cheap roof of this invention, the melting away of a little silica means very little so that thicker roofs can be used with advantage. The mixture used, marked 8, rapidly dries out and sets hard, and nearer the lower surface may change its characteristics into a vitrified or crystallized refractory 9. In the blocks are imbedded wires or strips of metal, 11, which may be corrugated or crimped etc., to give good holding power, and these pass through pulleys 10 over the furnace to spools 12, which may be unwound to feed the wire strips or wire as desired.

In Fig. 4, is a detail explaining one method of maintaining the individuality and separateness of the furnace roof elements, to permit of unequal lowering of the elements according to inequalities in rate of melting-off. A row of silica bricks set on edge 13, are tied with light wire 14, to maintain them in the proper position while the fresh mass of plastic refractory 15, is tamped down to be dried out into the solid mass 16. The supporting strips are shown, 17. Boards may be also used as partitions and these burn out on descending. The cracks or small spaces between the elements may be chinked up with a little clay for example, to stop the downward draft of air of rise of furnace gases.

This method and the use of self-formed elements is not limited to roofs, but may also be applied to produce and maintain furnace walls. In Fig. 5, the wall elements are suspended from imbedded wires or rods 18, from a point of suspension above 19. Plastic refractory of the type suggested is tamped or plastered on the back of the block or element where it adheres on drying, 20, and this gradually in the life or use of the furnace is moved forward and becomes the working face of the refractory, 21. The roof of the furnace is shown in one piece 22, with piles of untamped refractory mix, not yet tamped or smoothed down, and suspended by the wires, 23, supported by the member 24, which can be lowered by means not shown, for the purpose which has been made clear. Loose bricks, 25, may be placed in the corner to close the opening at that point, and this can also be daubed up for the same purpose or for further making the loose brick-joint tight.

A variety of materials can of course be used and applied in the same manner in different parts of the same furnace, where the metallurgist or operator prefers different substances, for example, in the wall, and in the roof.

This construction enables the use of larger and cheaper furnaces, and relieves the bricks of a furnace from the duties of material of construction and load-bearer, and also reduces the cost of furnace maintainance, which is ordinarily a very expensive matter in furnaces operating under severe conditions.

In a less advantageous way than the foregoing-described, the use of plastic or moldable refractory mix may be substitued by pre-burned shapes or bricks, as in Fig. 6, the suspending wires 25 have lugs 26, fitting to the blocks 27, which are added from time to time as needed.

The method of support required is not necessarily that of suspension. In Fig. 7, the furnace hearth 27 and roof 28 are shown and the side wall element 29, built up with plastic or moldable refractory mix 30 at the back, may rest on an iron plate 31, supported by rollers 32, permitting the forward movement of the member as consumed. If the furnace is an iron melting furnace the gradual melting off of a little iron from the plate does no harm, and similarly a copper plate can be used in a copper melting furnace. Even boards may be used, which burn away after the mix has dried out and set. In Fig. 8, the construction is similar to that in Fig. 7, except that the plate 33, carries bricks, 34.

In general, the maintainance of roofs, especially large roofs, is more difficult than that of walls, which are more easily repaired as well as involving less hard construction difficulties than arches. Particularly, when the walls are relieved of the problem of supporting the roof or arch, which I readily accomplish, the problem of walls is a relatively very minor one, so that my invention finds generally its principal utility in cheaper longer-lasting roofs.

By the use of heat resisting metals as nickel-chromium alloys integrally imbedded in roofs and bricks, loss by breaking and spalling can be largely avoided as wires and rods of such metal retain their strength nearly to the surface of the hot refractories. In Fig. 9, the roof of the furnace, consisting of the mass 36 supported by the wires 37, contains inserted wires and rods of metal 38, which hold the mass intact and from breaking and falling under difficult conditions. Carbon rods may also be used. This is a useful device under some conditions, but is not claimed in this application.

A common device in furnace construction where it is desirable or necessary to allow for expansion, is to use cardboard or paper or thin boards between bricks, which later burn out or shrink and leave space for expansion. In the application of massive self-formed furnace members as roofs, I may apply the same device and by inserting similar element in the refractory being applied in plastic form to the back or top of the said member, may likewise obtain, by the burning of such insert, cracks or spaces into which the refractory may expand at higher temperatures.

What I claim as new and desire to secure by Letters Patent, is:

1. Furnace element consisting of a refractory mass suspended by a metallic member permitting of movement toward the interior of the furnace, with an outside surface of plastic unvitrefied refractory composition.

2. Process of maintaining a furnace member which consists in moving the member forward toward the heating chamber and rebuilding the reverse surface with an unconsolidated refractory mix.

3. Process of maintaining a furnace member which consists in advancing the member toward the heat and building the reverse side up with refractory mix, and inserting therein metallic supporting device.

In testimony whereof I have hereunto signed my name.

ANSON G. BETTS.